UNITED STATES PATENT OFFICE.

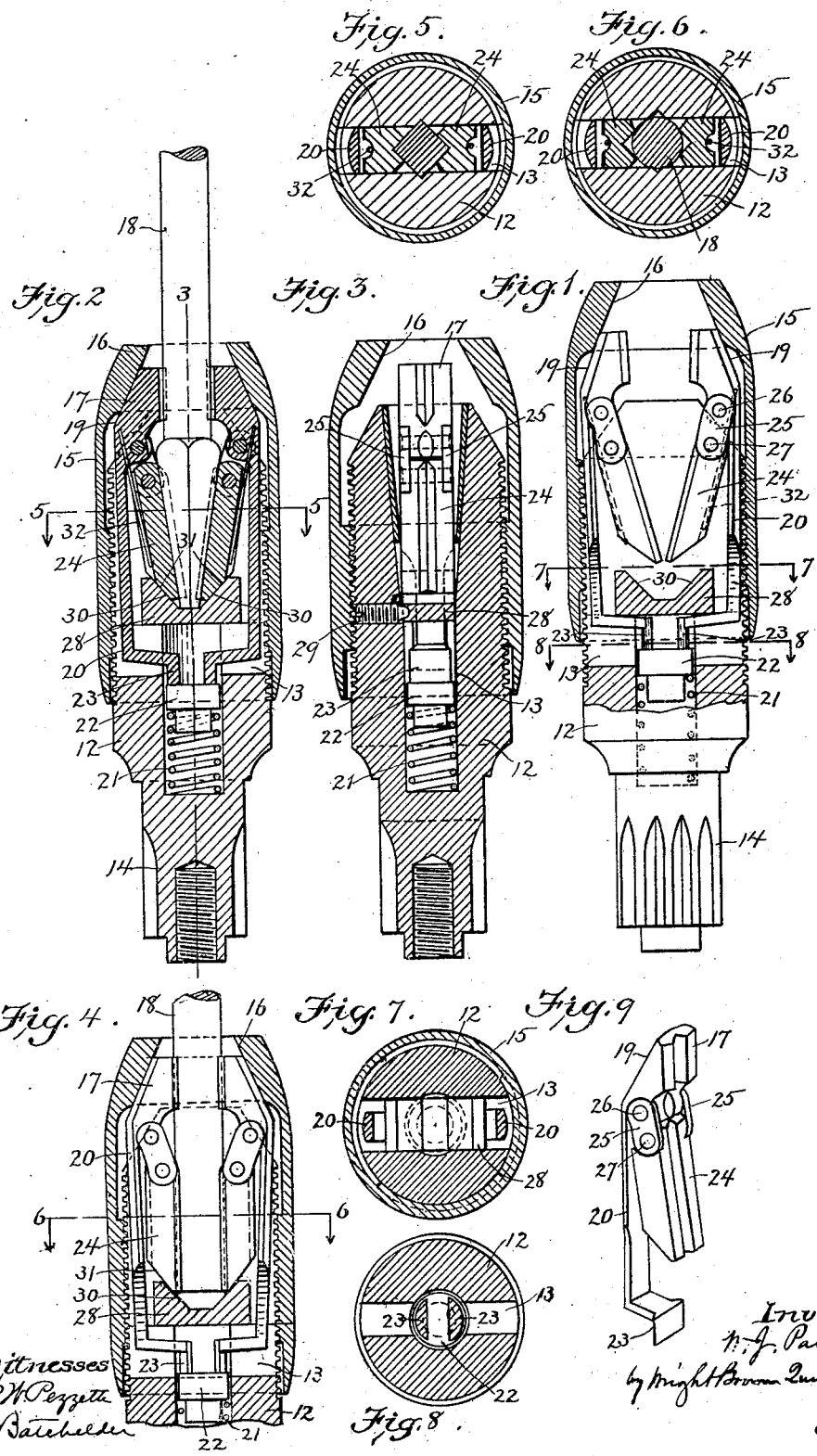

WILLIAM J. PARSONS, OF MONTAGUE, MASSACHUSETTS, ASSIGNOR TO MILLERS FALLS COMPANY, OF MILLERS FALLS, MASSACHUSETTS, A CORPORATION OF MASSACHUSETTS.

CHUCK.

No. 832,412.      Specification of Letters Patent.      Patented Oct. 2, 1906.

Application filed March 21, 1906. Serial No. 307,212.

*To all whom it may concern:*

Be it known that I, WILLIAM J. PARSONS, of Montague, in the county of Franklin and State of Massachusetts, have invented certain new and useful Improvements in Chucks, of which the following is a specification.

This invention relates to chucks, such as are used for holding tools—such as augers, bits, twist-drills, &c.—and particularly to chucks of this character adapted to be used on bit-braces.

The invention has for its object to provide a compact and efficient chuck of this character having jaws adapted to conform accurately to the shape of the portion of the tool engaged by the jaws, the jaws being conformable to such an extent that they may be used either in holding tapered shanks of any desired length and of different proportions as to taper, or cylindrical or other formed shanks, which are not tapered.

The invention consists in the improvements which I will now proceed to describe and claim.

Of the accompanying drawings, forming a part of this specification, Figure 1 represents a longitudinal section of a chuck embodying my invention, the chuck-jaws being in their inoperative position. Fig. 2 represents a view similar to Fig. 1, showing the jaws closed upon the tapered shank of a tool. Fig. 3 represents a section on line 3 3 of Fig. 2, the tool-shank being omitted. Fig. 4 represents a view similar to Fig. 2, showing the jaws engaged with a cylindrical shank which is not tapered. Fig. 5 represents a section on line 5 5 of Fig. 2. Fig. 6 represents a section on line 6 6 of Fig. 4. Fig. 7 represents a section on line 7 7 of Fig. 1. Fig. 8 represents a section on line 8 8 of Fig. 1. Fig. 9 represents a perspective view of one of the outer jaws and the inner jaw flexibly connected therewith.

The same numerals of reference indicate the same parts in all the figures.

In the drawings, 12 represents a head which is transversely divided by a longitudinal slot 13, extending inwardly from the outer end of the head partly to the inner end, the latter being preferably reduced to form a shank 14, which is adapted to be engaged with a bit-brace or other suitable holder. The head 12 is of cylindrical form, and its perimeter is provided with a screw-thread interrupted, of course, by the slot 13, the said thread being adapted to engage an internal thread formed in a jaw-closing sleeve 15, the outer end of which is contracted and has a tapering internal surface 16 adapted to coöperate with tapered faces on the outer jaws, hereinafter described, to force the said jaws together after the sleeve is turned to move it toward the inner end of the head.

17 17 represent two outer jaws which are provided with grooved inner surfaces forming biting or grasping angles adapted to grasp a tool-shank 18 and with tapered external faces 19, which are in sliding contact with the tapered internal surface 16 of the jaw-closing collar 15. The jaws 17 are provided with shanks 20, which project inwardly into the slot 13 of the head, the sides of their ends being loosely engaged with the head at the inner portion of the slot, so that they are adapted to tip or swing freely to permit a free movement of the jaws toward and from each other. Means are preferably provided for yieldingly forcing the jaws outwardly from the slot 13, and thus holding them in yielding engagement with the tapered internal surface of the closing sleeve 15 when the latter is retracted, as shown in Fig. 1, the said means in this embodiment of the invention comprising a spring 21, located in a cavity formed in the inner portion of the head 12, and a plunger 22, supported yieldingly by the spring, the shanks 20 being provided with offset inner ends 23, the ends of which bear upon the plunger 22, as clearly shown in Figs. 1, 2, and 4.

24 24 represent inner jaws which are flexibly connected with the outer jaws 17 by means of links 25 25, pivoted at 26 to the outer jaws and at 27 to the inner jaws. The inner faces of the inner jaws are grooved to form biting or shank-engaging angles similar to those of the jaws 17.

28 represents an abutment rigidly affixed by a screw 29 or other suitable means to the head 12 within the slot 13, the said abutment being between the inner and outer ends of the slot and being recessed on its outer side to form inclined guides 30 30, adapted to coöperate with inclined or beveled faces 31 31, formed on the inner ends of the inner jaws 24 24. The inner jaws are enabled by their flexible connection with the outer jaws through the links 25 to stand at an angle with the outer jaws, so that the outer and inner jaws may simultaneously engage a cylindrical shank portion which is not tapered and a tapered shank portion at the inner end of the cylindrical portion, as shown in Fig. 2. The said flexible connection also enables the inner jaws to stand in alinement with the outer jaws, so that both the outer and inner jaws may grasp a cylindrical shank portion which is of uniform diameter along the entire portion engaged by the jaws, as shown in Fig. 4.

When the jaw-closing sleeve 15 is moved outwardly, as shown in Fig. 1, the outer jaws, 17 are projected by the spring 21, the inner jaws, which are supported by the outer jaws, being correspondingly projected. The jaws are now opened so that a tool-shank may be freely inserted between them until it comes to a bearing on the abutment 28, the inner jaws being swung yieldingly inward by means of springs 32, the outer ends of which are affixed to the outer jaws, said springs bearing against the outer surfaces of the inner jaws. When a tool-shank is inserted between the jaws, the inner jaws yield to permit the seating of the inner end of the tool-shank upon the abutment 28. The jaw-closing sleeve 15 being now turned inwardly upon the head, its tapered inner surface 16 forces the outer jaws toward each other and at the same time presses the said jaws longitudinally inward, causing the inner ends of the inner jaws to bear upon the inclined guides 30. The outer and inner jaws are therefore simultaneously closed upon the tool-shank, the flexible connection between said jaws enabling the shank-grasping surfaces of the jaws to conform to the shape of the tool-shank whether the same be partly cylindrical and partly tapering, as shown in Fig. 2, or wholly cylindrical, as shown in Fig. 4, the jaws being also adaptable to tapering shanks of various tapers and proportions— that is to say, the tapered portion of the shank may be of such length that it will be grasped by both the outer and the inner jaws.

It will be seen from the foregoing that the two series of jaws flexibly connected as described and therefore conformable to a wide range of variety in the form of tool-shanks enable any shank to be firmly engaged and held whether the shank be of tapering form or of uniform size along its jaw-engaging portion.

It is obvious that the inner jaws 24 are independent in their gripping action of the outer jaws 17, the outer jaws and their shanks 20 being holders or supports for the inner jaws.

I claim—

1. A chuck comprising a slotted head, outer jaws having tool-engaging faces and loosely supported by the head, inner jaws having tool-engaging faces and flexibly connected with and supported by the outer jaws and free to assume clamping positions with their acting faces either parallel or tapering relatively to each other and to the faces of the outer jaws, and means for simultaneously contracting the outer and inner jaws.

2. A chuck comprising a slotted head, outer jaws having tool-engaging faces and having shanks loosely engaged with the head within the slot thereof, inner jaws having tool-engaging faces and flexibly connected with the outer jaws and free to assume clamping positions with their acting faces either parallel or tapering relatively to each other and to the faces of the outer jaw, and means for simultaneously contracting the outer and inner jaws.

3. A chuck comprising a slotted head, outer jaws having shanks loosely engaged with the head within the slot thereof, links pivoted to the outer jaws and extending inwardly therefrom, inner jaws pivoted to the inner portions of the links, and means for simultaneously contracting the outer and inner jaws.

4. A chuck comprising a slotted head, having an abutment provided with fixed inclined guides within the slot, outer jaws having shanks extending inwardly beyond the abutment, and loosely engaged with the head, inner jaws flexibly connected with the outer jaws, and adapted to coöperate with said inclined guides, and means for simultaneously closing and longitudinally moving the outer jaws, the longitudinal movement of said jaws being imparted, through the flexible connection, to the inner jaws, and causing the closing of the inner jaws by the said guides.

5. A chuck comprising a slotted head, outer jaws loosely engaged with the head, yielding means for projecting said jaws longitudinally of the head, inner jaws flexibly connected with the outer jaws, means for simultaneously closing and longitudinally moving the outer jaws, the longitudinal movement of said jaws being imparted, through the flexible connection, to the inner jaws, and means for inwardly guiding or deflecting the inner jaws.

6. A chuck comprising a slotted, externally-threaded head, having an abutment provided with inclined guides, outer jaws loosely engaged with the head, yielding means for projecting said outer jaws longitudinally of the head, inner jaws flexibly connected with the outer jaws, and adapted to bear at their inner ends on said guides, and an internally-threaded sleeve engaging the external thread of the head, and provided with a tapered inner surface engaging the outer jaws, said sleeve being adapted to simultaneously close and longitudinally move the outer jaws, and cause the inclined guides to close the inner jaws.

7. A chuck comprising a slotted, externally-threaded head, having an abutment within the slot, said abutment being separated by a space from the inner end of the slot, and provided with inclined guides, outer jaws having shanks extending into the slot at opposite sides of the abutment, said shanks having offset inner ends projecting into the said space, means for exerting yielding outward pressure on said offset ends; inner jaws flexibly connected with the outer jaws and adapted to bear at their inner ends on said guides, and an internally-threaded sleeve engaging the external thread of the head, and provided with a tapered inner surface, engaging the outer jaws.

8. A chuck comprising a slotted head, jaw-holders loosely supported by the head, jaws flexibly connected with and supported by the holders, means for simultaneously forcing the jaw-holders longitudinally and laterally inward, and jaw-closing means coöperating with the inner end portions of the jaws.

9. A chuck, comprising a slotted head, jaw-holders loosely supported by the head, jaws flexibly connected with and supported by the holders, means for simultaneously forcing the jaw-holders longitudinally and laterally inward, means for yieldingly pressing the jaw-holders longitudinally outward, and fixed jaw-closing guides coöperating with the inner ends of the jaws.

In testimony whereof I have affixed my signature in presence of two witnesses.

WILLIAM J. PARSONS.

Witnesses:
WM. G. STEBBINS,
LIZZIE STRACHAN.